(12) United States Patent
Brown et al.

(10) Patent No.: US 7,976,266 B2
(45) Date of Patent: Jul. 12, 2011

(54) POWER SYSTEM

(75) Inventors: Ian Trevor Brown, San Diego, CA (US); Daniel James Doll, Poway, CA (US)

(73) Assignee: Solar Turbines Inc, San Diego, CA (US)

( * ) Notice: Subject to any disclaimer, the term of this patent is extended or adjusted under 35 U.S.C. 154(b) by 1139 days.

(21) Appl. No.: 11/477,373

(22) Filed: Jun. 30, 2006

(65) Prior Publication Data

US 2008/0003093 A1    Jan. 3, 2008

(51) Int. Cl.
*F01D 25/28* (2006.01)

(52) U.S. Cl. .......... 415/1; 415/126; 415/213.1; 60/797; 60/798; 29/464; 29/559; 29/824; 29/281.1; 269/56; 269/71; 269/73; 248/678; 248/157; 248/424; 248/346.01

(58) Field of Classification Search .................. 415/126, 415/213.1, 214.1, 1; 60/796, 797, 798; 29/464, 29/559, 824, 281.1; 269/56, 71, 73; 248/678, 248/157, 424, 346.01
See application file for complete search history.

(56) References Cited

U.S. PATENT DOCUMENTS

| 2,265,940 | A | 12/1941 | Forest |
| 2,930,492 | A | 3/1960 | Metcalf |
| 3,556,672 | A | 1/1971 | Gentile |
| 3,837,164 | A | 9/1974 | Carr |
| 4,044,442 | A | 8/1977 | Carlson |
| 4,086,690 | A | 5/1978 | Bernasconi |
| 4,451,979 | A | 6/1984 | Schuster |
| 4,567,649 | A | 2/1986 | Ades et al. |
| 4,570,053 | A | 2/1986 | Ades et al. |
| 4,590,653 | A | 5/1986 | Ades et al. |
| 4,635,336 | A | 1/1987 | Ades et al. |
| 5,383,652 | A | 1/1995 | Van Den Berg |
| 5,473,883 | A | 12/1995 | Naudet |
| 5,870,824 | A | 2/1999 | Lilja et al. |
| 5,921,075 | A | 7/1999 | Shimoyama et al. |
| 6,279,309 | B1 | 8/2001 | Lawlor et al. |
| 6,415,610 | B1 | 7/2002 | Parker |
| 6,792,809 | B1 | 9/2004 | Moore |
| 6,837,673 | B2 | 1/2005 | Ootoshi et al. |
| 6,871,504 | B2 | 3/2005 | Kuroki et al. |
| 7,159,403 | B2 | 1/2007 | Kastrup et al. |
| 7,185,498 | B1 | 3/2007 | Jonsson |
| 2003/0014961 | A1 | 1/2003 | Lawlor |
| 2004/0060302 | A1 | 4/2004 | Kuroki |
| 2005/0150095 | A1 | 7/2005 | Ashar et al. |
| 2007/0033795 | A1 * | 2/2007 | McCaffrey et al. ............. 29/464 |

FOREIGN PATENT DOCUMENTS

| EP | 0246470 | 11/1987 |
| EP | 1300548 | 4/2003 |

(Continued)

*Primary Examiner* — Christopher Verdier

(74) *Attorney, Agent, or Firm* — Finnegan, Henderson, Farabow, Garrett & Dunner LLP

(57) ABSTRACT

A power system includes a gas turbine engine. The gas turbine engine may include a first portion, a second portion, and a longitudinal axis. The power system may also include a first moveable support engaged to the first portion of the gas turbine engine. The first moveable support may be operable to at least partially constrain movement of the first portion of the gas turbine engine during operation of the gas turbine engine. Additionally, the first moveable support may be operable to at least partially support the first portion of the gas turbine engine as the first portion of the gas turbine engine is moved away from the longitudinal axis independently of the second portion of the gas turbine engine.

19 Claims, 13 Drawing Sheets

FOREIGN PATENT DOCUMENTS

| | | |
|---|---|---|
| GB | 2268314 A | 1/1994 |
| JP | 03074501 | 3/1991 |
| WO | 98/50727 | 11/1998 |
| WO | WO 00/17492 | 3/2000 |

* cited by examiner

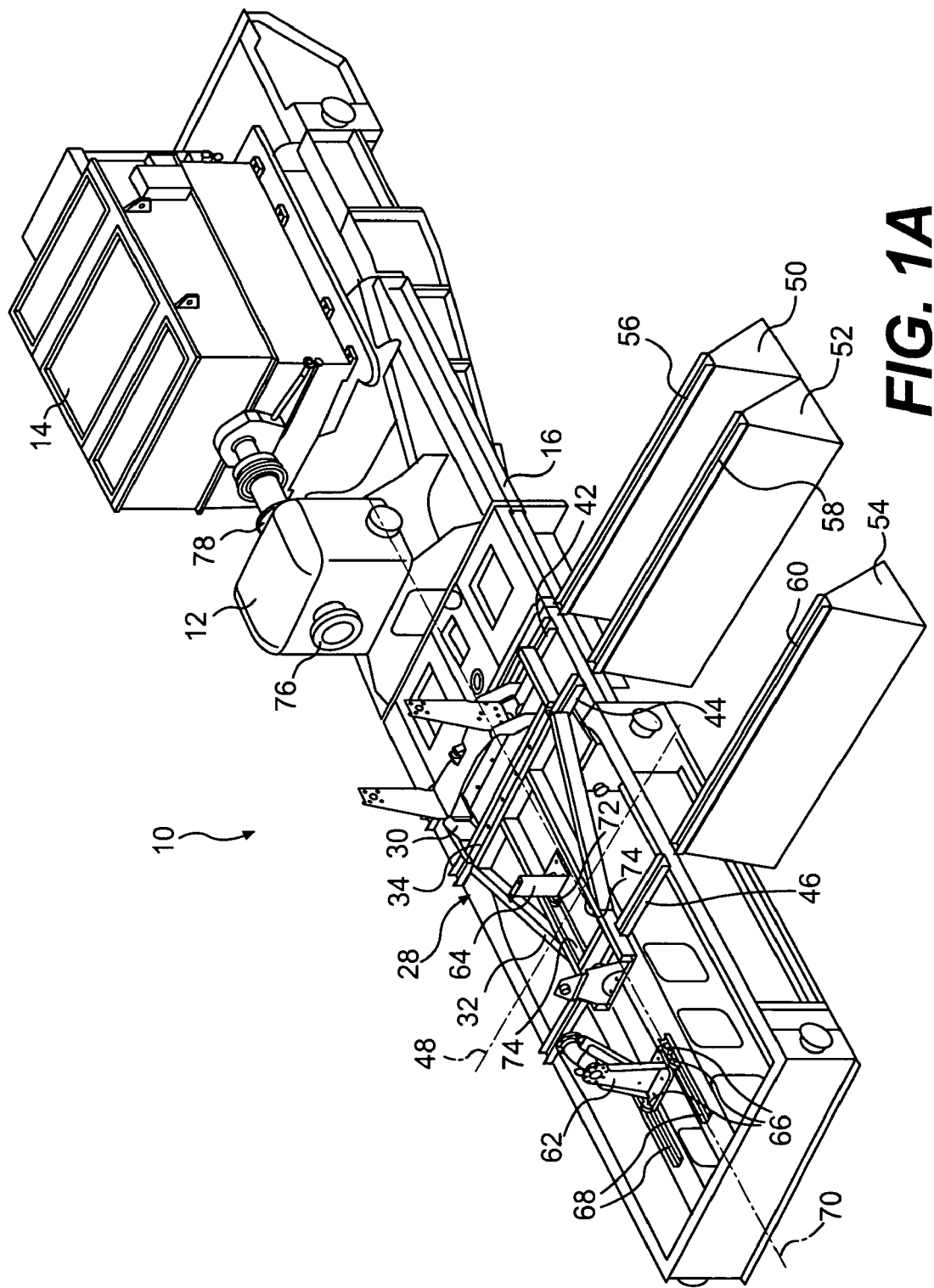

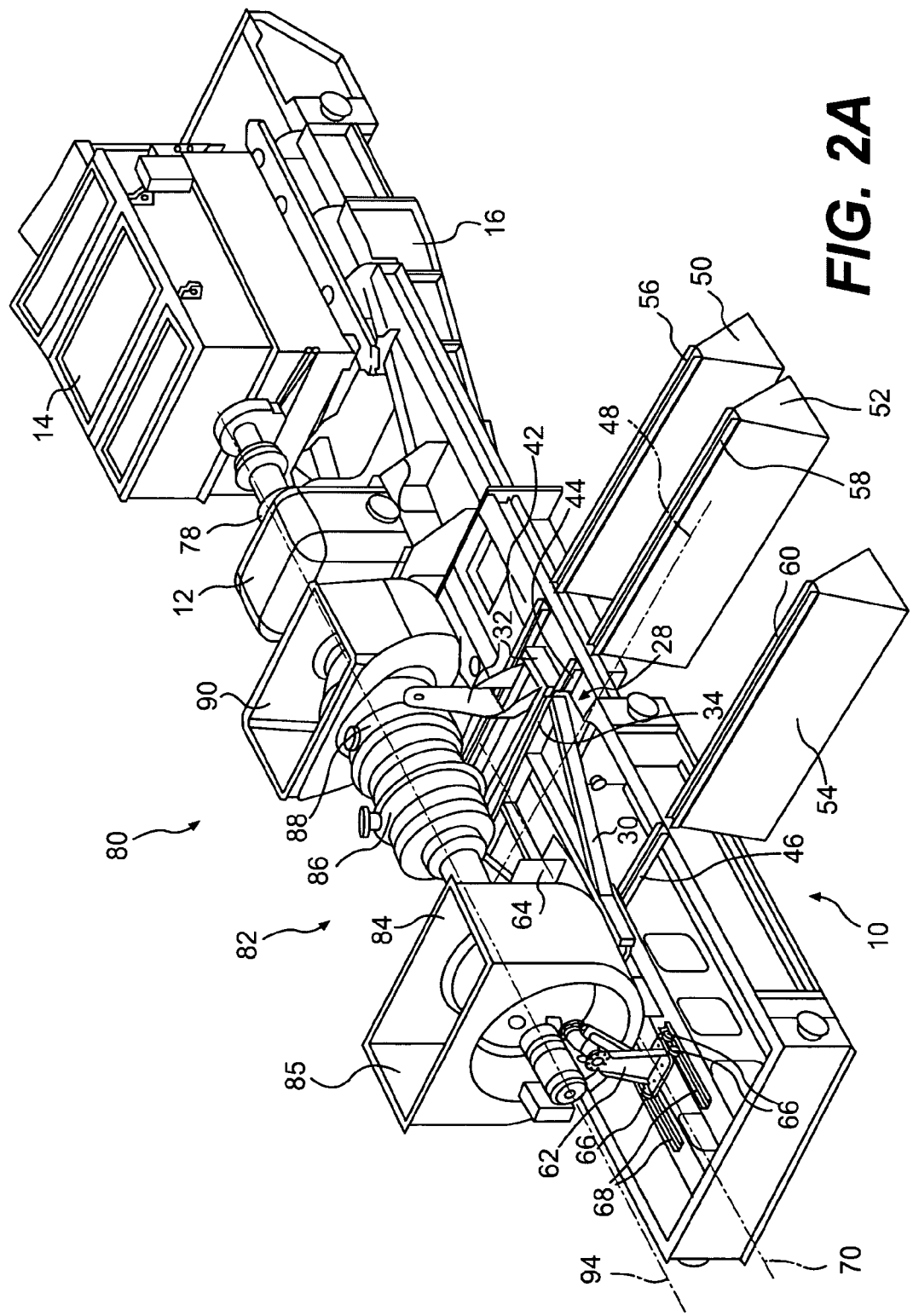

POWER SYSTEM

TECHNICAL FIELD

The present disclosure relates to power systems and, more particularly, to power systems having a gas turbine engine.

BACKGROUND

Many power systems include a gas turbine engine and a power load, such as a pump, compressor, or electric generator, drivingly connected to the gas turbine engine. Various configurations of support systems are employed to support the gas turbine engine and the power load of such power systems. In some such power systems, the gas turbine engine and the power load are both attached through fixed mounts to a common, stationary support structure.

Unfortunately, such a support structure may make replacing or repairing the gas turbine engine difficult. Removing the gas turbine engine from the stationary support structure may involve unfastening the gas turbine engine from numerous fixed mounts, which may require considerable time and effort. Additionally, after the gas turbine engine is unfastened from the support structure, removing the gas turbine engine from the support structure may require using lifting equipment and exercising considerable care to avoid colliding the gas turbine engine with other objects.

Additionally, many repair operations may involve separating sections of the gas turbine engine from one another, which may require removing the gas turbine engine from the support structure. For example, replacing a damaged section of the gas turbine engine may require removing the gas turbine engine from the support structure, separating the damaged section from the other sections, installing a replacement section, and reassembling the sections of the gas turbine engine. When the gas turbine engine is off of its support structure, supporting and maneuvering the heavy, unwieldy sections of the gas turbine engine when separating and reassembling them may be quite difficult.

U.S. Pat. No. 6,871,504 to Kuroki et al. ("the '504 patent") shows a power system having a gas turbine engine mounted to a base by sliders and rails. The power system of the '504 patent includes a gas turbine engine, a reduction gear, a generator, and a starting apparatus drivingly connected to each other and supported by a common base. Sliders attached to the underside of the gas turbine engine rest on rails attached to a top side of the base. The sliders and rails disclosed by the '504 patent enable sliding the gas turbine engine onto and off of the common base.

Although the '504 patent discloses sliders and rails that allow sliding the gas turbine engine thereof onto and off of the common base, certain disadvantages persist. For example, the power system shown by the '504 patent does not include any provisions for supporting and maneuvering different sections of the gas turbine engine independently. Accordingly, separating sections of the gas turbine from one another to repair the gas turbine, as well as removing one or more sections of the gas turbine engine from the common base separately from other sections, may be difficult and time consuming.

The power system of the present disclosure solves one or more of the problems set forth above.

SUMMARY OF THE INVENTION

One disclosed embodiment relates to a power system that includes a gas turbine engine. The gas turbine engine may include a first portion, a second portion, and a longitudinal axis. The power system may also include a first moveable support engaged to the first portion of the gas turbine engine. The first moveable support may be operable to at least partially constrain movement of the first portion of the gas turbine engine during operation of the gas turbine engine. Additionally, the first moveable support may be operable to at least partially support the first portion of the gas turbine engine as the first portion of the gas turbine engine is moved away from the longitudinal axis independently of the second portion of the gas turbine engine.

Another embodiment relates to a method of operating a power system, including selectively operating a gas turbine engine to produce power. The method may also include constraining movement of the gas turbine engine while operating the gas turbine engine to produce power, which may include at least partially constraining movement of a first portion of the gas turbine engine with a first moveable support. Additionally, the method may include, when not operating the gas turbine engine to produce power, selectively moving the first portion of the gas turbine engine away from a longitudinal axis of the gas turbine engine independently of a second portion of the gas turbine engine while at least partially supporting the first portion of the gas turbine engine with the first moveable support.

A further embodiment relates to a support system for a gas turbine engine, the gas turbine engine having a first portion and a second portion. The support system may include a base, a first support that is supported by the base, and a second support that is supported by the base. The first support may be operable to at least partially support the first portion of the gas turbine engine. The second support may be operable to at least partially constrain movement of the second portion of the gas turbine engine during operation of the gas turbine engine. The second support may also be operable to at least partially support the second portion of the gas turbine engine while the second portion of the gas turbine engine moves relative to the first portion of the gas turbine engine, which may include the second support being operable to at least partially support the second portion of the gas turbine engine while sliding off of the base.

BRIEF DESCRIPTION OF THE DRAWINGS

FIG. 1A is a perspective view of a support system for a power system;

FIG. 2A is a perspective view of a power system that includes the support system shown in FIG. 1A, wherein the power system is in a first state;

DETAILED DESCRIPTION

Figure 1B:
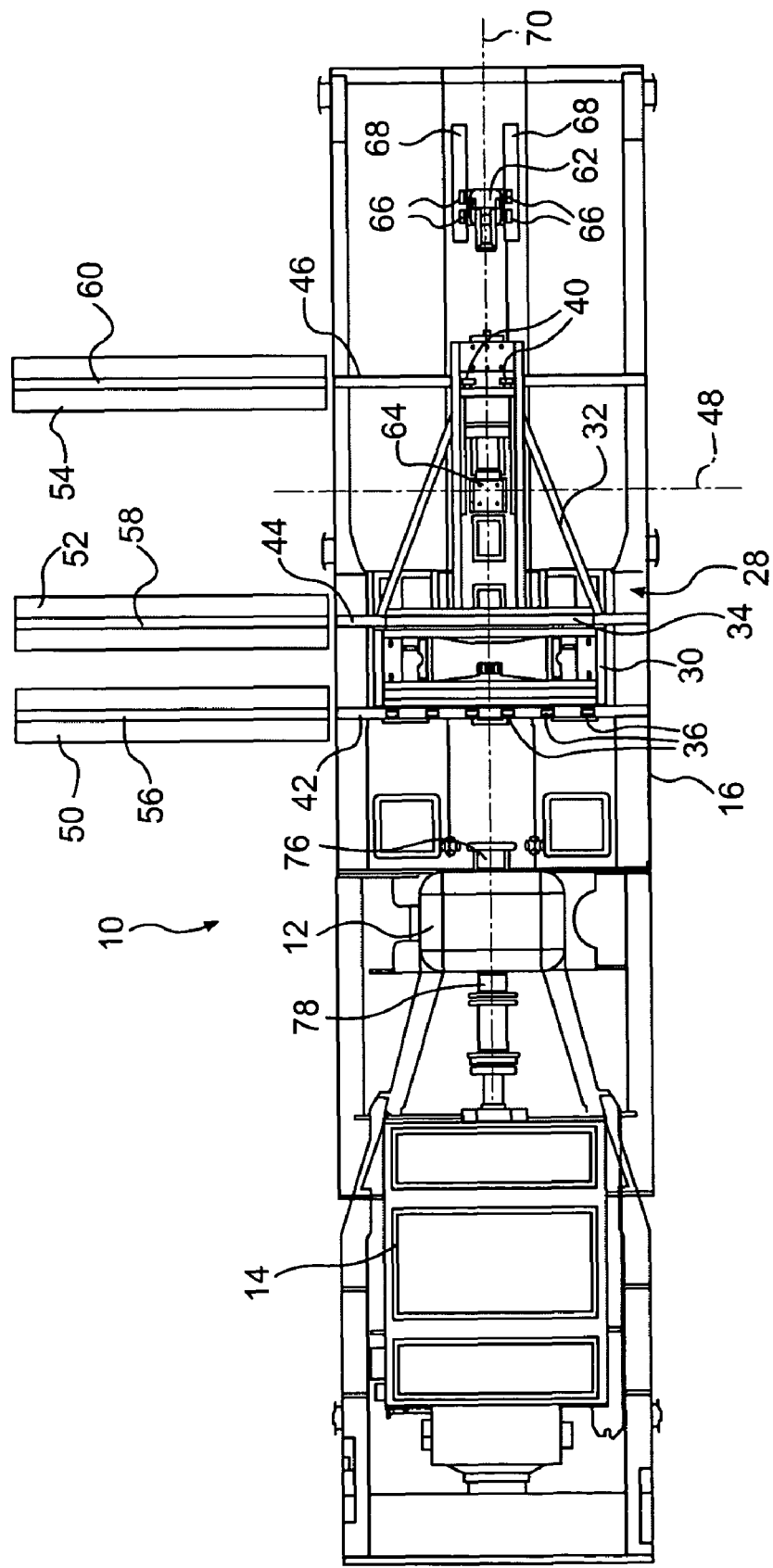
FIG. 1B is a plan view of the support system shown in FIG. 1A.

FIGS. 1A-1D illustrate one embodiment of a support system 10 for a power system having a gas turbine engine (not shown in FIGS. 1A-1D), support system 10 having a power-transfer unit 12 and a power load 14 mounted thereon. Support system 10 may include a base/support 16 that supports power-transfer unit 12 and power load 14. For example, as FIGS. 1A-1D show, base/support 16 may be a frame. Base/support 16 may be supported by various entities, including, but not limited to, the ground (not shown), one or more structures supported by the ground (not shown), one or more structures of a vehicle (not shown), and/or one or more structures of a marine vessel (not shown).

Support system 10 may include various provisions for supporting a gas turbine engine (not shown). For example, support system 10 may include a frame 28 for supporting a gas turbine engine from base/support 16. Frame 28 may include a support 30 and a support 32 disposed adjacent one another. Support 30 and support 32 may include provisions (not shown) for fastening support 30 and support 32 in fixed positions relative to one another. For example, support 30 and support 32 may include corresponding bolt holes (not shown) at an interface 34 between support 30 and support 32 for fixedly fastening support 30 to support 32. When not fastened in fixed positions with respect to one another, supports 30, 32 may be able to move independently of one another.

Figure 1C:
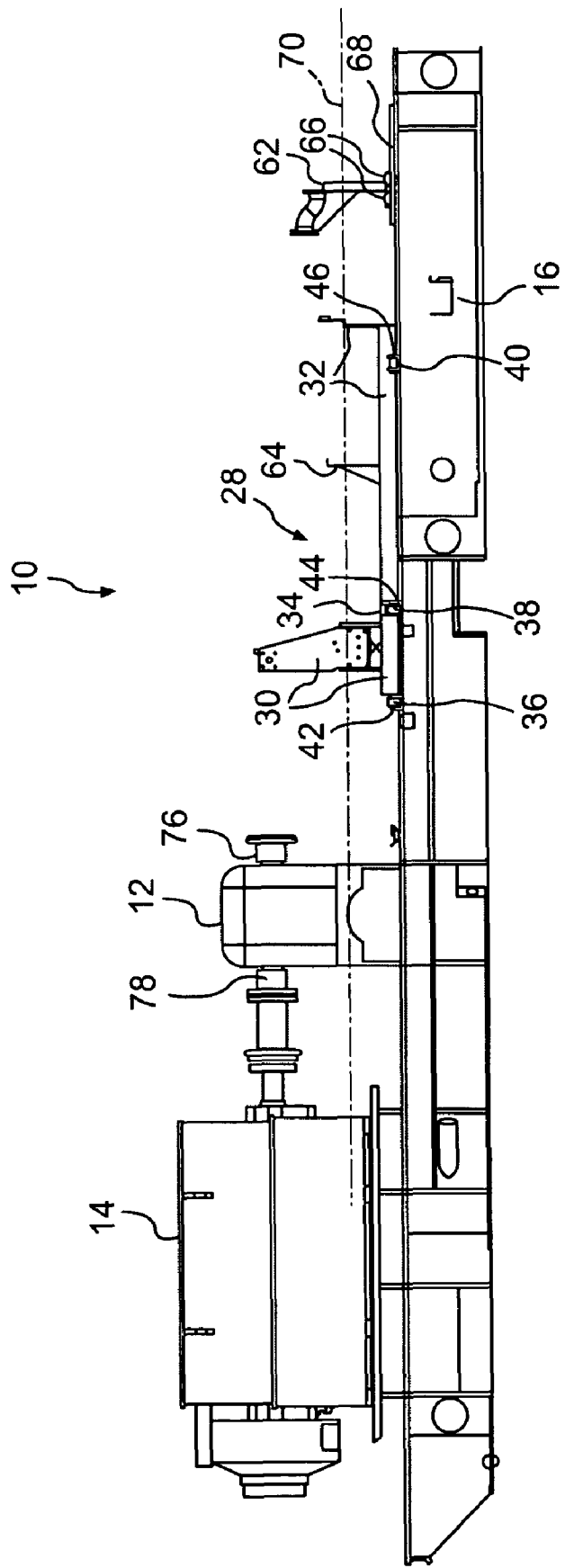
FIG. 1C is a side view of the support system shown in FIG. 1A.
Figure 1D:
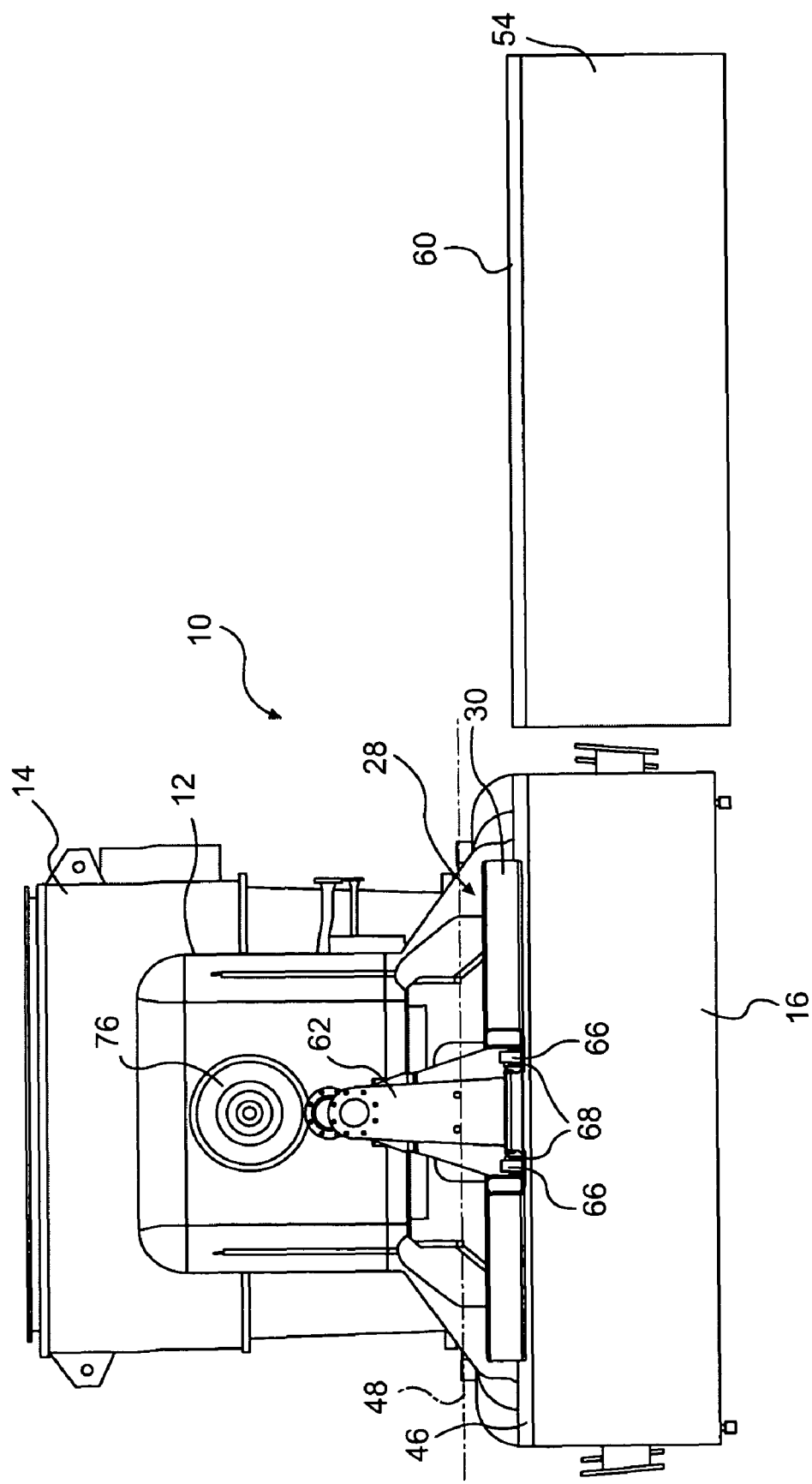
FIG. 1D is an end view of the support system shown in FIG. 1A.

In some embodiments, such as the embodiment shown in FIGS. 1A-1D, supports 30, 32 may be configured to slide with respect to base/support 16. Base/support 16 may include guide tracks 42, 44, 46 extending parallel to an axis 48 (FIGS. 1A, 1B). As is best shown in FIG. 1C, supports 30, 32 may be guided by rollers 36, 38, 40 disposed in guide tracks 42, 44, 46 on base/support 16.

Support system 10 may include various provisions (not shown) for holding supports 30, 32 stationary on base/support 16 when desired. For example, support system 10 may include one or more jacks for raising supports 30, 32 until rollers 36, 38, 40 are separated from guide tracks 42, 44, 46, one or more props for supporting supports 30, 32 in such elevated positions, and fasteners for fixing supports 30, 32 in such elevated positions. Additionally, or alternatively, support system 10 may also include various other provisions (not shown) for selectively securing supports 30, 32 at various positions along axis 48, including, but not limited to, clamps, detents, fasteners, stops, and ratchets.

Support system 10 may also include provisions for supporting support 30 and/or support 32 off of base/support 16. For example, support system 10 may include portable supports 50, 52, 54 configured to hold supports 30, 32. As FIGS. 1A-1D show, portable supports 50, 52, 54 may include guide tracks 56, 58, 60 configured to receive rollers 36, 38, 40 of supports 30, 32.

Support system 10 may also include a moveable support 62 and a moveable support 64. Moveable support 62 may be configured to slide on base/support 16. As FIGS. 1A-1D show, moveable support 62 may be guided by rollers 66 disposed in guide tracks 68 on base/support 16. Guide tracks 68 may extend parallel to an axis 70 (FIGS. 1A-1C), which may be disposed at an angle, such as 90 degrees, to axis 48. Moveable support 64 may be configured to slide on support 32. Moveable support 64 may be guided by rollers 72 disposed in guide tracks 74 on support 32. Like guide tracks 68, guide tracks 74 may extend parallel to axis 70. Support system 10 may also include various provisions (not shown) for selectively securing moveable supports 62, 64 at various positions along axis 70, including, but not limited to, clamps, detents, fasteners, stops, and ratchets.

Support system 10 is not limited to the configuration shown in FIGS. 1A-1D. For example, base/support 16 may be a collection of separate support structures supported by the ground, rather than a frame. Additionally, rather than being parts of a common frame 28, supports 30, 32 may be fully independent of one another. Furthermore, support system 10 may include provisions other than rollers 36, 38, 40 and guide tracks 42, 44, 46 for facilitating movement of supports 30, 32. For example, support system 10 may include other types of slider systems and/or various types of moveable linkages for facilitating movement of supports 30, 32. Furthermore, each of the components of support system 10 may have various shapes other than those shown in FIGS. 1A-1D.

Power-transfer unit 12 may be any type of component configured to receive power from a power source (not shown in FIGS. 1A-1D) and transmit that power to power load 14. Power-transfer unit 12 may include an input shaft 76 for receiving power from a power source, an output shaft 78 connected to power load 14, and various components for transferring power from input shaft 76 to output shaft 78. In some embodiments, power-transfer unit 12 may be a speed-reduction unit configured to rotate output shaft 78 at a slower speed than the power source connected to input shaft 76 rotates input shaft 76.

Power load 14 may be any type of component configured to receive power from power-transfer unit 12 and perform one or more tasks with that power. For example, power load 14 may be an electric generator, a pump, or a compressor.

Figure 2B:
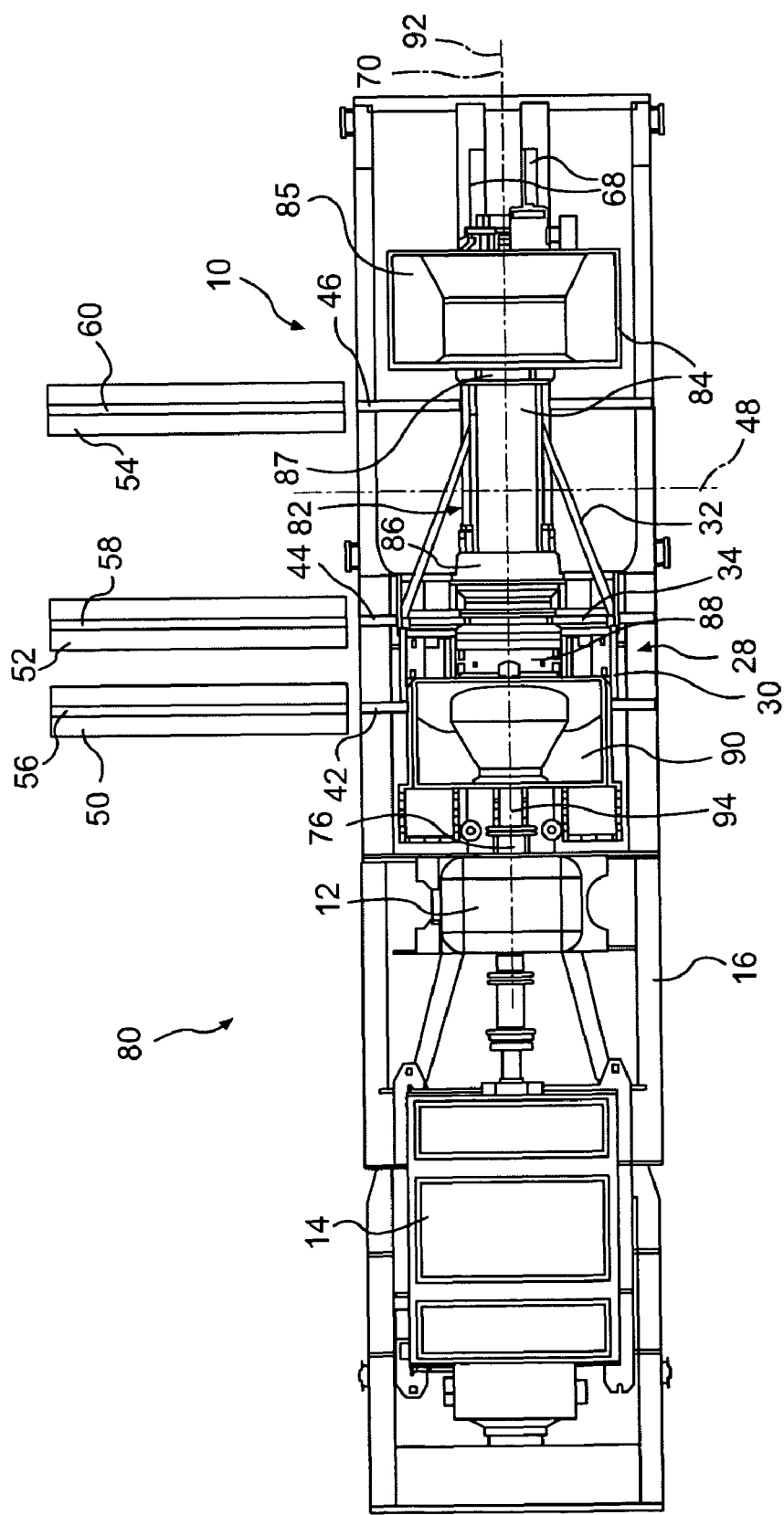
FIG. 2B is a plan view of the power system shown in FIG. 2A.
Figure 2C:
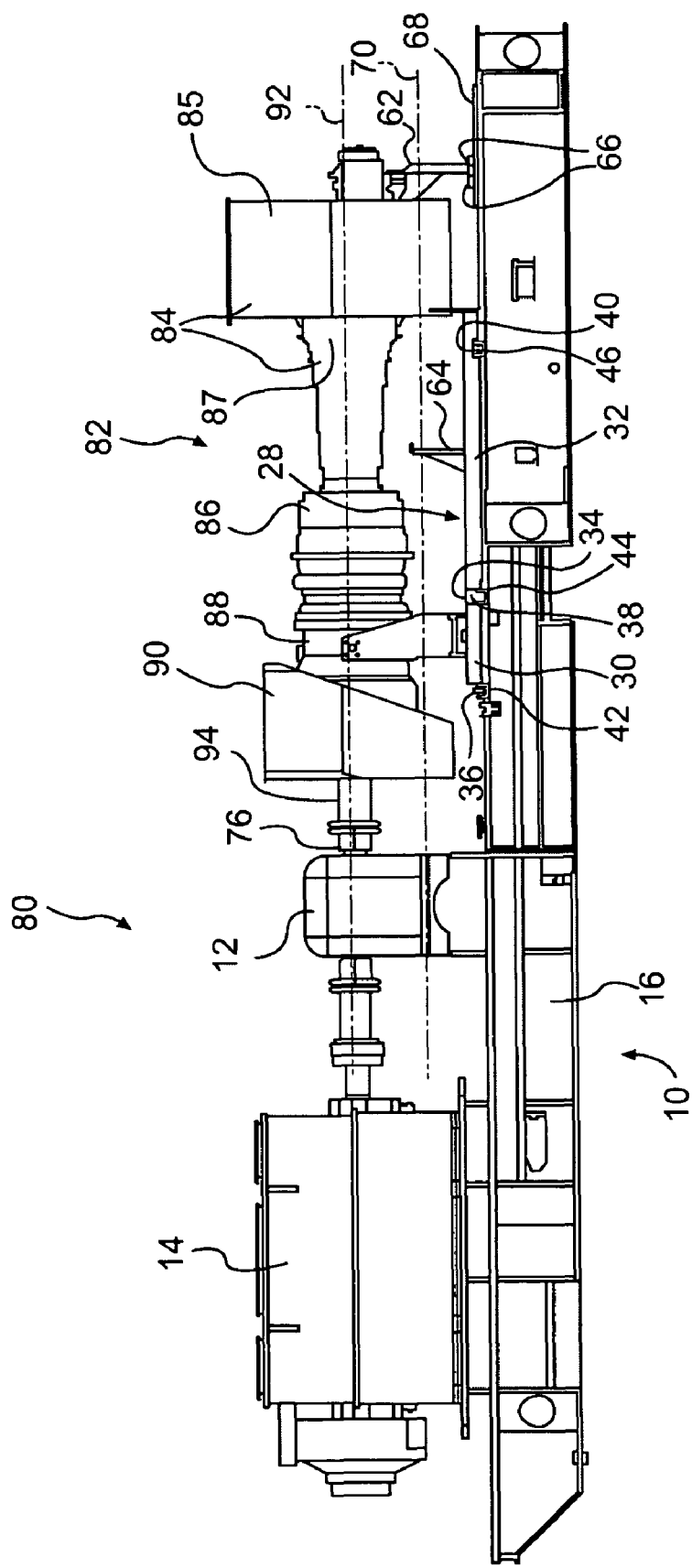
FIG. 2C is a side view of the power system shown in FIG. 2A.
Figure 2D:
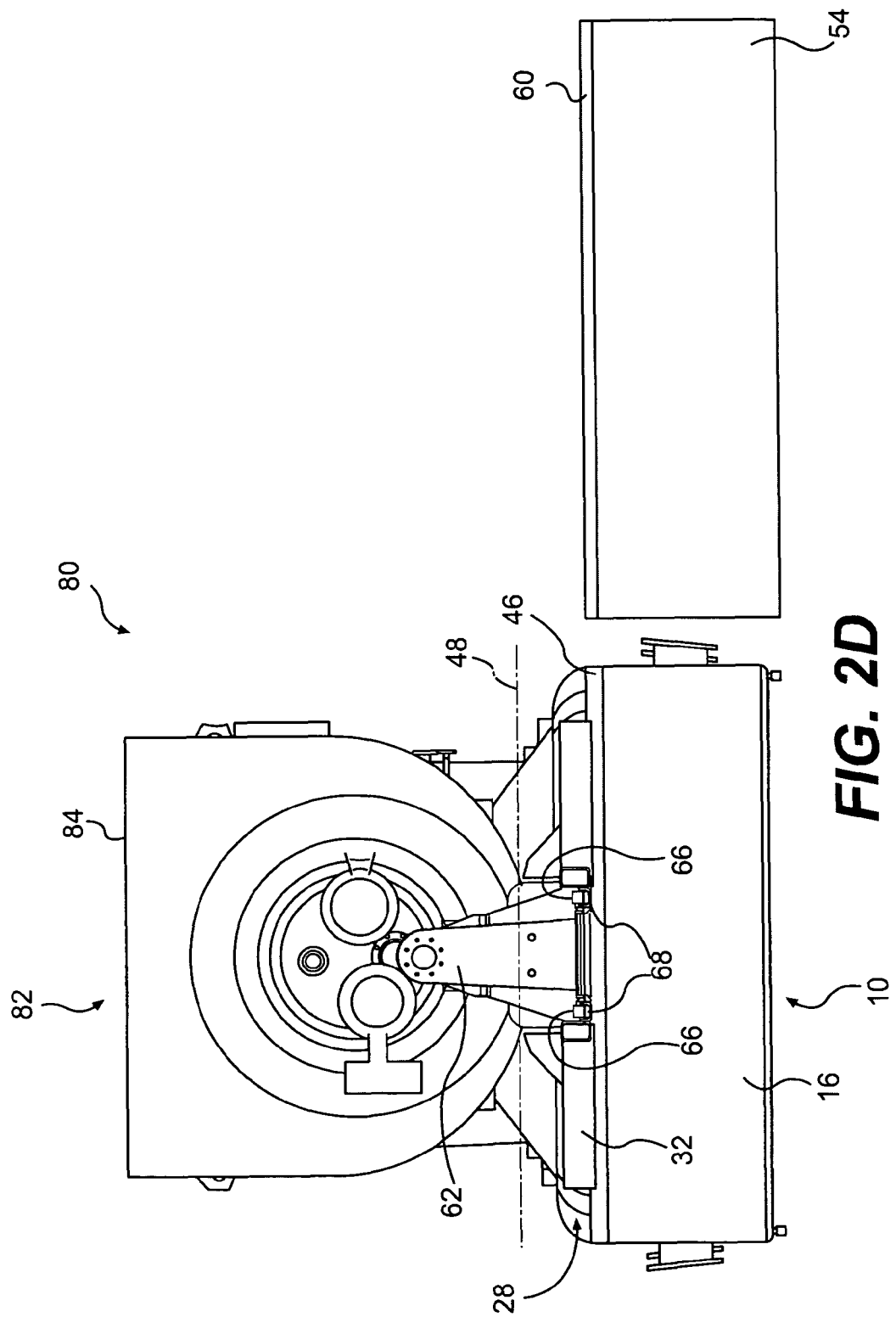
FIG. 2D is an end view of the power system shown in FIG. 2A.

FIGS. 2A-2D show a power system 80 that includes support system 10, power-transfer unit 12, power load 14, and a gas turbine engine 82 mounted to support system 10. Gas turbine engine 82 may include a gas producer 84, a combustor 86, a power-turbine section 88, and an exhaust collector 90 fixedly connected to one another. Gas producer 84 may include intake ducting 85 and a compressor 87. Support 32 may support gas producer 84, and support 30 may support power-turbine section 88. A longitudinal axis 92 of gas turbine engine 82 may extend substantially parallel to axis 70. As is best seen in FIGS. 2B and 2C, gas turbine engine 82 may include an output shaft 94 connected to input shaft 76 of power-transfer unit 12.

Mounting of gas turbine engine 82 to support system 10 is not limited to the example shown in FIGS. 2A-2D. For example, sections of gas turbine engine 82 other than power-turbine section 88 and gas producer 84 may mount to supports 30 and 32, respectively.

INDUSTRIAL APPLICABILITY

Power system 80 and support system 10 thereof may have application wherever power is required for performing one or more tasks. Gas turbine engine 82 may be operated to drive input shaft 76 of power-transfer unit 12 and, thereby, drive power load 14 to pump fluid, generate electricity, or do other work. While gas turbine engine 82 is driving power load 14, support 30 and support 32 may be fastened in substantially fixed positions with respect to one another and fixedly fastened to base/support 16 to hold the various portions of gas turbine engine 82 in substantially fixed positions with respect to base/support 16.

Figure 3A:
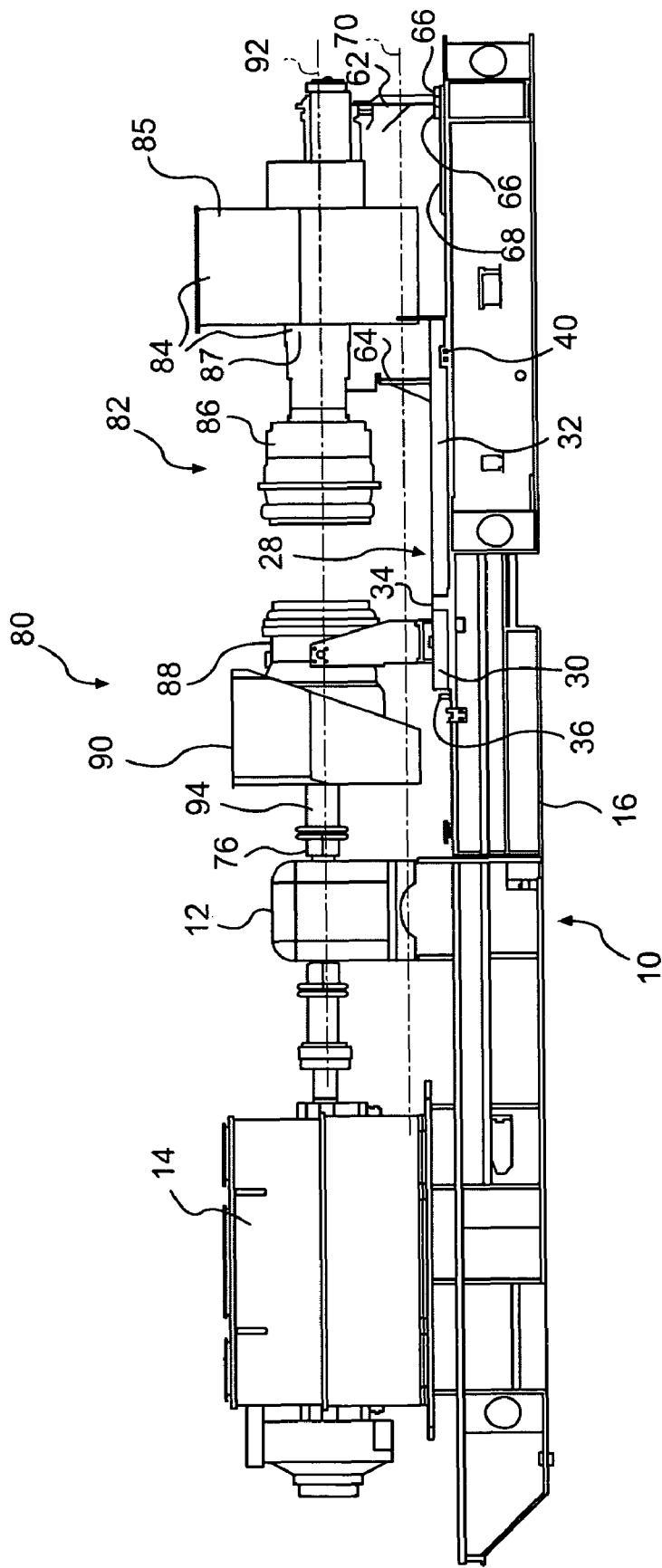
FIG. 3A is a side view of the power system shown in FIG. 2A, wherein the power system is in a second state.

When gas turbine engine 82 is not being operated to drive power load 14, support system 10 may be used to support various portions of gas turbine engine 82 while they are moved for various purposes, such as repair. For example, as FIG. 3A shows, moveable supports 62, 64 may be used to support compressor 87 and combustor 86 while compressor 87 and combustor 86 are moved along longitudinal axis 92 away from power-turbine section 88 and exhaust collector 90. In order to allow this, moveable supports 62, 64 may first be engaged to compressor 87 in a manner such that they may fully support compressor 87 and combustor 86. Subsequently, any connections between compressor 87 and support 32 may be released, and combustor 86 may be unfastened from power-turbine section 88. Additionally, compressor 87 may be disconnected from intake ducting 85 to allow compressor 87 to move along longitudinal axis 92 while intake ducting 85 remains stationary. For example, in some embodiments annular rings (not shown) connected between an outer surface of compressor 87 and intake ducting 85 may be removed so that compressor 87 may move through a center portion of intake ducting 85.

Subsequently, moveable supports 62, 64 may be slid along axis 70 on guide tracks 68, 74 to move compressor 87 and combustor 86 along longitudinal axis 92 away from power-turbine section 88. Once gas producer 84 and combustor 86 are at a desired position along axis 92, the positions of moveable supports 62, 64 may be secured to secure the position of gas producer 84 and combustor 86.

Figure 3B:
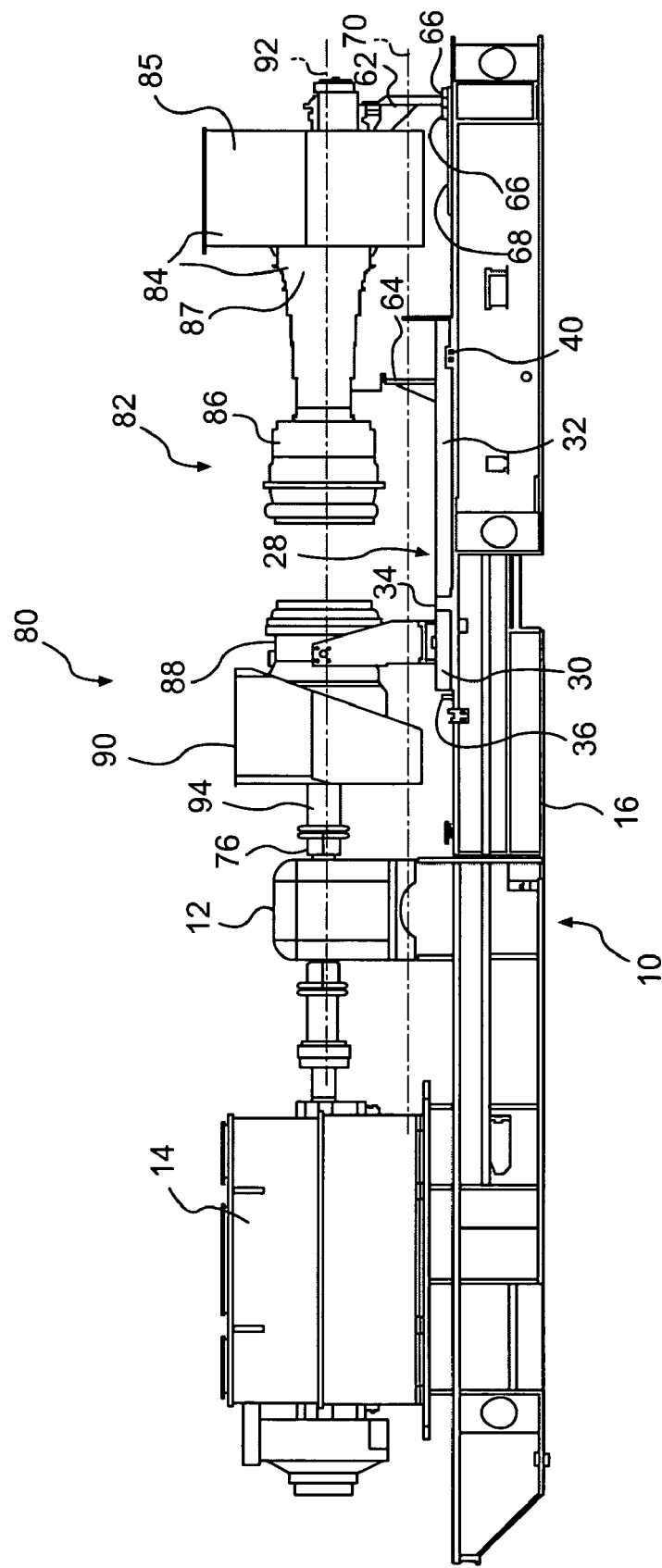
FIG. 3B is a side view of the power system shown in FIG. 3A, wherein the power system is in a third state.

As FIG. 3B shows, intake ducting 85 may be left connected to compressor 87 and moved with compressor 87 and combustor 86 along axis 92 while moveable supports 62, 64 support compressor 87, intake ducting 85, and combustor 86. This may entail unfastening any connections fixing intake ducting 85 to support 32, other ductwork (not shown), and/or other components before sliding moveable supports 62, 64 along axis 70.

Figure 4A:
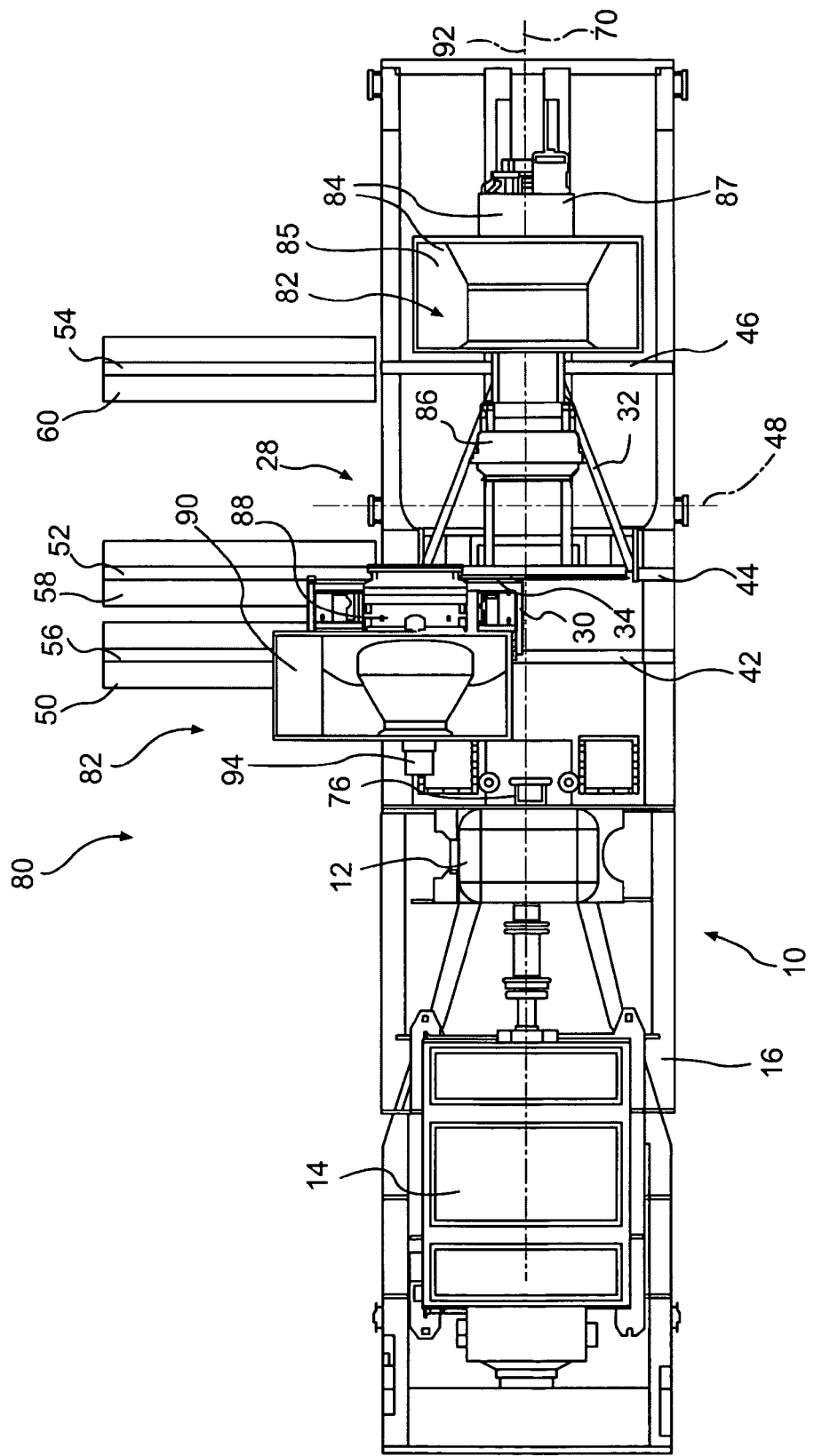
FIG. 4A is a plan view of the power system shown in FIG. 2A, wherein the power system is in a fourth state.
Figure 4B:
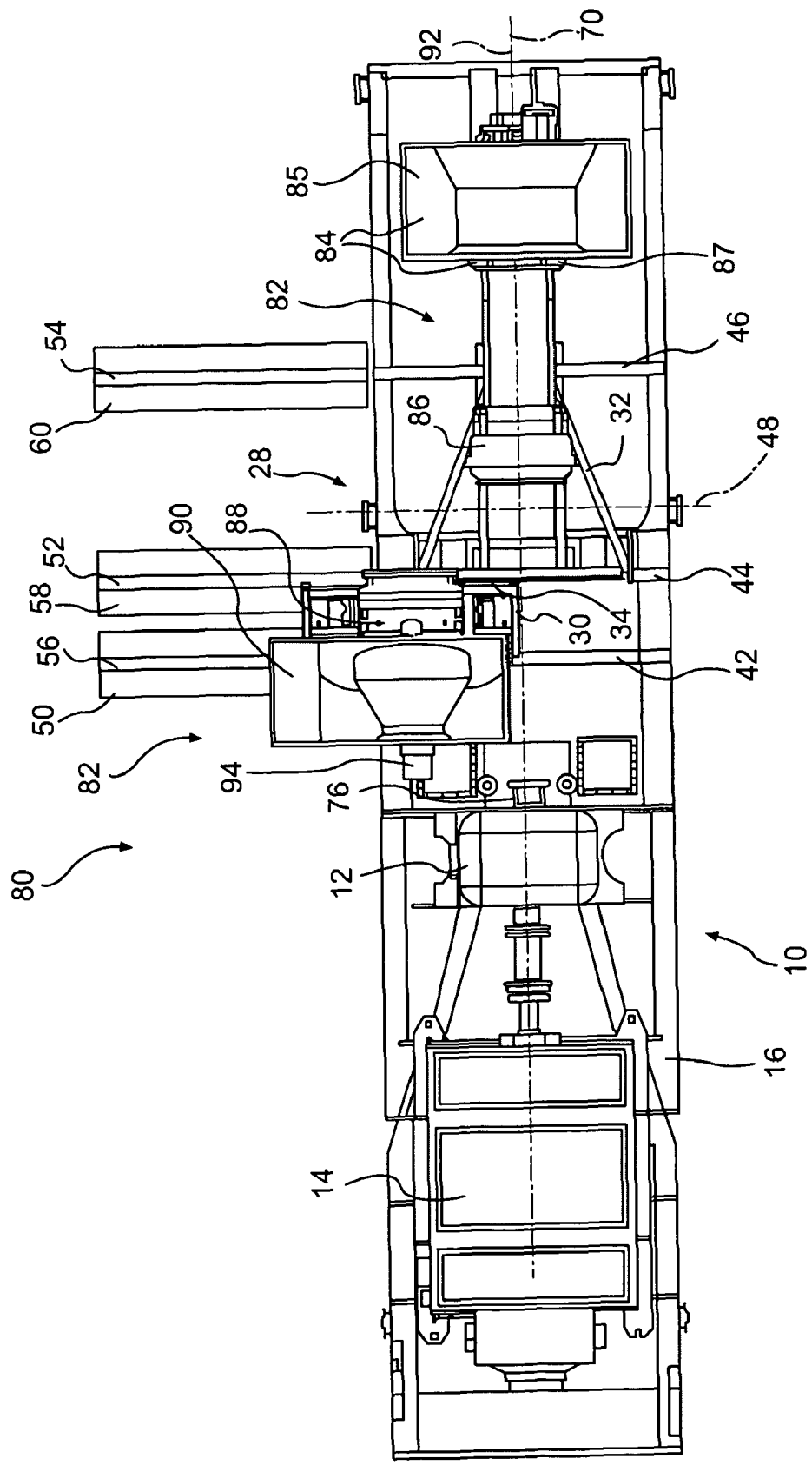
FIG. 4B is a plan view of the power system shown in FIG. 2A, wherein the power system is in a fifth state.

Additionally, as FIGS. 4A and 4B show, support 30 may be used to support power-turbine section 88 and exhaust collector 90 while they are moved away from longitudinal axis 92 independently of gas producer 84 and combustor 86. In order to allow this, output shaft 94 of gas turbine engine 82 may be disconnected from input shaft 76 of power-transfer unit 12. Additionally, any engagements fixing the position of support 30 with respect to support 32 and base/support 16 may be released. Subsequently, support 30 may be slid on guide tracks 42, 44 to move power-turbine section 88 and exhaust collector 90 away from longitudinal axis 92. In some embodiments, such as the embodiment shown in FIGS. 4A and 4B, support 30 may fully support power-turbine section 88 and exhaust collector 90 as they are moved away from longitudinal axis 92. As support 30 is moved along axis 48, support 30 may begin to move off of guide tracks 42, 44 onto guide tracks 56, 58 of portable supports 50, 52. Once power-turbine section 88 and exhaust collector 90 are in a desired position along axis 48, various provisions may be used to fix the position of support 30, power-turbine section 88, and exhaust collector 90 along axis 48.

Figure 5:
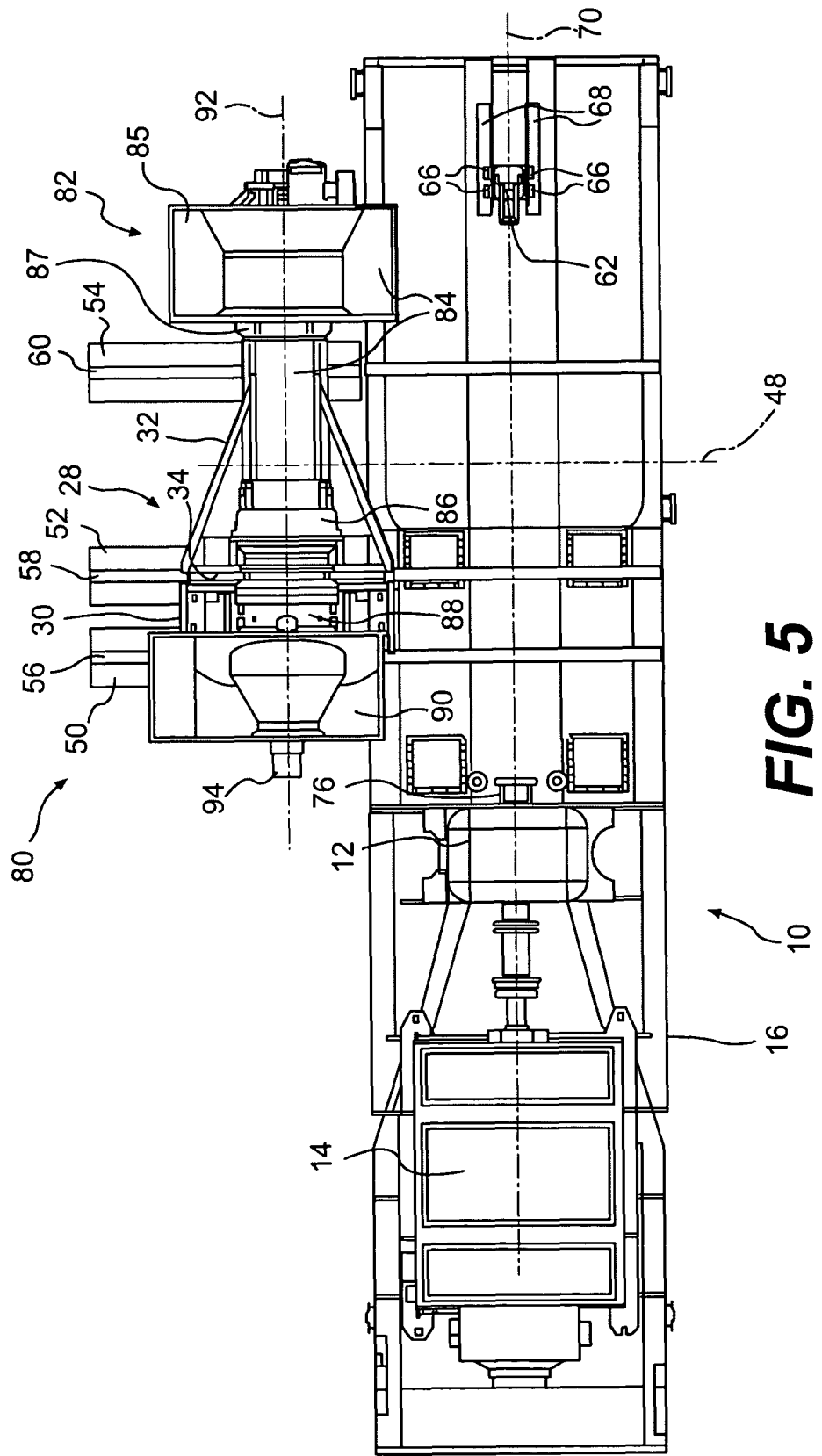
FIG. 5 is a plan view of the power system shown in FIG. 2A, wherein the power system is in a sixth state.

As FIG. 5 shows, support system 10 may also be used to support gas turbine engine 82 as a unit as it is moved along axis 48. In order to allow this, supports 30, 32 may be left fixedly fastened to one another, output shaft 94 of gas turbine engine 82 may be disconnected from input shaft 76 of power-transfer unit 12, and any engagements fixing the position of frame 28 with respect to base/support 16 may be released. Frame 28 may then be slid along guide tracks 42, 44, 46. As frame 28 moves along axis 48, it may begin to move off of base/support 16 onto portable supports 50, 52, 54.

The above-discussed abilities may facilitate maintenance of power system 80 in a number of ways, thereby helping keep power system 80 available to do work a high percentage of the time. Longitudinally separating sections of gas turbine engine 82 may provide access to internal components for repair. In some cases, longitudinally separating sections of gas turbine engine 82 may also eliminate longitudinal overlap between components of the separated sections so that one or more of the sections may be moved away from longitudinal axis 92 independently of other sections. In circumstances where gas turbine engine 82 has been separated longitudinally, one or more sections of gas turbine engine 82 may be moved away from longitudinal axis 92 to improve the access to internal components. Alternatively, one or more sections of gas turbine engine 82 may be moved away from longitudinal axis 92 independently of other sections to provide access to internal components, without longitudinally separating gas turbine engine 82.

Additionally, the ability to move one or more sections of gas turbine engine 82 away from longitudinal axis 92 independently of other sections, may allow quickly and easily replacing one or more sections of gas turbine engine 82, without replacing other sections. For example, power-turbine section 88 and exhaust collector 90 may be replaced, without replacing gas producer 84 and combustor 86. To do so, support 30, power-turbine section 88, and exhaust collector 90 may first be slid off of base/support 16 onto portable supports 50, 52, while support 32, gas producer 84, and combustor 86 are left on base/support 16. Subsequently, support 30, power-turbine section 88, and exhaust collector 90 may be removed from portable supports 50, 52, and a replacement support, power-turbine section, and exhaust collector may be loaded onto portable supports 50, 52 and slid into place on base/support 16.

Additionally, the disclosed embodiments allow quickly and easily replacing gas turbine engine 82 as a unit. To do so, frame 28 and gas turbine engine 82 may first be slid off of base/support 16 onto portable supports 50, 52, 54 and then removed from portable supports 50, 52, 54. Subsequently, a replacement frame and gas turbine engine may be loaded onto portable supports 50, 52, 54, and slid into place on base/support 16.

After gas turbine engine 82 or a section thereof is removed from base/support 16, it may be transported to a convenient service facility for repair. During transport and repair of gas turbine engine 82 or a section thereof, frame 28 or a support 30, 32 thereof may serve as a transport frame. When frame 28 and gas turbine engine 82 are separated from base/support 16, frame 28 may serve as a transport frame fully supporting gas turbine engine 82 during various operations. For example, frame 28 may fully support gas turbine engine 82 during operations such as loading gas turbine engine 82 onto a vehicle, transporting gas turbine engine 82 with the vehicle, unloading gas turbine engine 82 from the vehicle, and repairing gas turbine engine 82. Similarly, when support 30, power turbine unit 88, and exhaust collector 90 are separated from base/support 16, gas producer 84, and combustor 86, support 30 may serve as a transport frame fully supporting power turbine unit 88 and exhaust collector 90 during transport and repair.

Use of support system 10 is not limited to the examples discussed above and shown in the figures. For example, in some cases, support 30, power-turbine section 88, and exhaust collector 90 may be held stationary on base/support 16 while support 32 is moved on guide tracks 44, 46 to move gas producer 84 and combustor 86 away from longitudinal axis 92. Additionally, gas turbine engine 82 may be separated at points other than between combustor 86 and power-turbine section 88, such as between gas producer 84 and combustor 86. Furthermore, gas turbine engine 82 and/or sections thereof may be moved for reasons other than those discussed above.

In addition to providing the advantages discussed above, by utilizing guide tracks 42, 44, 46, 68, 74 to limit movement of supports 30, 32, 62, 64 to predetermined paths, the disclosed embodiments allow precisely controlling the movement of gas turbine engine 82 and sections thereof. This may help prevent collisions when maneuvering gas turbine engine 82 and/or components thereof. It may also facilitate achieving proper alignment between components when assembling them to one another. These benefits may be particularly significant under harsh conditions, such as in adverse weather in a marine environment.

It will be apparent to those skilled in the art that various modifications and variations can be made in the power system and methods without departing from the scope of the disclosure. Other embodiments of the disclosed power system and methods will be apparent to those skilled in the art from consideration of the specification and practice of the power system and methods disclosed herein. It is intended that the specification and examples be considered as exemplary only, with a true scope of the disclosure being indicated by the following claims and their equivalents.

What is claimed is:

1. A power system, including:
   a gas turbine engine, the gas turbine engine including a first portion, a second portion, and a longitudinal axis;
   a base generally defining a support plane for the power system;
   a first moveable support that is supported by the base, the first moveable support being engaged to the first portion of the gas turbine engine, the first moveable support being operable to
      at least partially constrain movement of the first portion of the gas turbine engine during operation of the gas turbine engine; and
      at least partially support the first portion of the gas turbine engine as the first moveable support is moved along a guide track and the first portion of the gas turbine engine is moved away from the longitudinal axis independently of the second portion of the gas turbine engine, wherein the guide track extends substantially parallel to the support plane and at an angle to the longitudinal axis.

2. The power system of claim 1, wherein the first moveable support is operable to substantially fully support the first portion of the gas turbine engine as the first portion of the gas turbine engine is being moved away from the longitudinal axis independently of the second portion of the gas turbine engine.

3. The power system of claim 1, wherein
   the first moveable support is operable to slide with respect to the base when at least partially supporting the first portion of the gas turbine engine as the first portion of the gas turbine engine moves away from the longitudinal axis.

4. The power system of claim 3, wherein the first moveable support is operable to slide off of the base while at least partially supporting the first portion of the gas turbine engine.

5. The power system of claim 1, further including a second moveable support operable to at least partially support the second portion of the gas turbine engine while the second portion of the gas turbine engine is moved at least partially in the direction of the longitudinal axis independently of the first portion of the gas turbine engine.

6. The power system of claim 1, further including:
   a second moveable support engaged to the second portion of the gas turbine engine;
   wherein the first moveable support and the second moveable support are parts of a frame configured to substantially fully support the first portion of the gas turbine engine and the second portion of the gas turbine engine in substantially fixed relative positions when the first moveable support and the second moveable support are fastened in substantially fixed positions with respect to one another.

7. The power system of claim 6, further including:
   a power load drivingly connected to the gas turbine engine; and
   wherein the base supports the power load and the frame.

8. A method of using a power system, including:
   selectively operating a gas turbine engine to produce power;
   while operating the gas turbine engine to produce power, constraining movement of the gas turbine engine, including at least partially constraining movement of a first portion of the gas turbine engine with a first moveable support supported from a base that generally defines a support plane for the power system; and
   when not operating the gas turbine engine to produce power, selectively moving the first portion of the gas turbine engine away from a longitudinal axis of the gas turbine engine independently of a second portion of the gas turbine engine while at least partially supporting the first portion of the gas turbine engine with the first moveable support and moving the first movable support along a guide track that extends substantially parallel to the support plane and at an angle to the longitudinal axis.

9. The method of claim 8, wherein constraining movement of the gas turbine engine when operating the gas turbine engine to produce power includes substantially fully supporting the first portion of the gas turbine engine and the second portion of the gas turbine engine with a frame that includes the first moveable support and a second support engaged to the second portion of the gas turbine engine.

10. The method of claim 9, further including:
    while operating the gas turbine engine to produce power, driving a power load with the gas turbine engine; and
    while driving the power load with the gas turbine engine, supporting the power load and the frame with the base.

11. The method of claim 10, further including:
    when not operating the gas turbine engine to produce power, selectively disconnecting the gas turbine engine from the power load and removing the frame, the first portion of the gas turbine engine, and the second portion of the gas turbine engine from the base as a unit.

12. The method of claim 8, wherein:
    at least partially constraining movement of the first portion of the gas turbine engine with the first moveable support when operating the gas turbine engine to produce power includes supporting the first moveable support on the base; and
    selectively moving the first portion of the gas turbine engine away from the longitudinal axis of the gas turbine engine independently of the second portion of the gas turbine engine while at least partially supporting the first portion of the gas turbine engine with the first moveable support includes selectively sliding the first moveable support off of the base while at least partially supporting the first portion of the gas turbine engine with the first moveable support.

13. The method of claim 8, wherein selectively moving the first portion of the gas turbine engine away from the longitudinal axis of the gas turbine engine independently of a second portion of the gas turbine engine while at least partially supporting the first portion of the gas turbine engine with the first moveable support includes substantially fully supporting the first portion of the gas turbine engine with the first moveable support.

14. The method of claim 8, further including:
when not operating the gas turbine engine to produce power, moving the second portion of the gas turbine engine at least partially in the direction of the longitudinal axis of the gas turbine engine, while at least partially supporting the second portion of the gas turbine engine with the base.

15. A support system for a gas turbine engine, the gas turbine engine having a first portion and a second portion, the support system including:
a base;
a first support that is supported by the base, the first support being operable to at least partially support the first portion of the gas turbine engine; and
a second support that is supported by the base, the second support being operable to at least partially constrain movement of the second portion of the gas turbine engine during operation of the gas turbine engine; and
the second support also being operable to at least partially support the second portion of the gas turbine engine while the second portion of the gas turbine engine moves relative to the first portion of the gas turbine engine, including the second support being operable to at least partially support the second portion of the gas turbine engine while the second support is sliding off of the base.

16. The support system of claim 15, further including at least one guide for directing movement of the second support.

17. The support system of claim 15, further including at least one portable support operable to receive the second support as it slides off of the base.

18. The support system of claim 15, wherein the first support and the second support are part of a frame that is operable to fully support the first portion of the gas turbine engine and the second portion of the gas turbine engine in substantially fixed relative positions when the first support and the second support are fastened in substantially fixed relative positions.

19. The support system of claim 18, wherein:
the frame is operable to be fastened in a substantially fixed position with respect to the base to substantially fully support the first portion of the gas turbine engine and the second portion of the gas turbine engine in substantially fixed positions with respect to the base; and
the frame is further operable, when not fastened in a substantially fixed position with respect to the base, to substantially fully support the first portion of the gas turbine engine and the second portion of the gas turbine engine while sliding off of the first support.

* * * * *